Patented Apr. 29, 1952

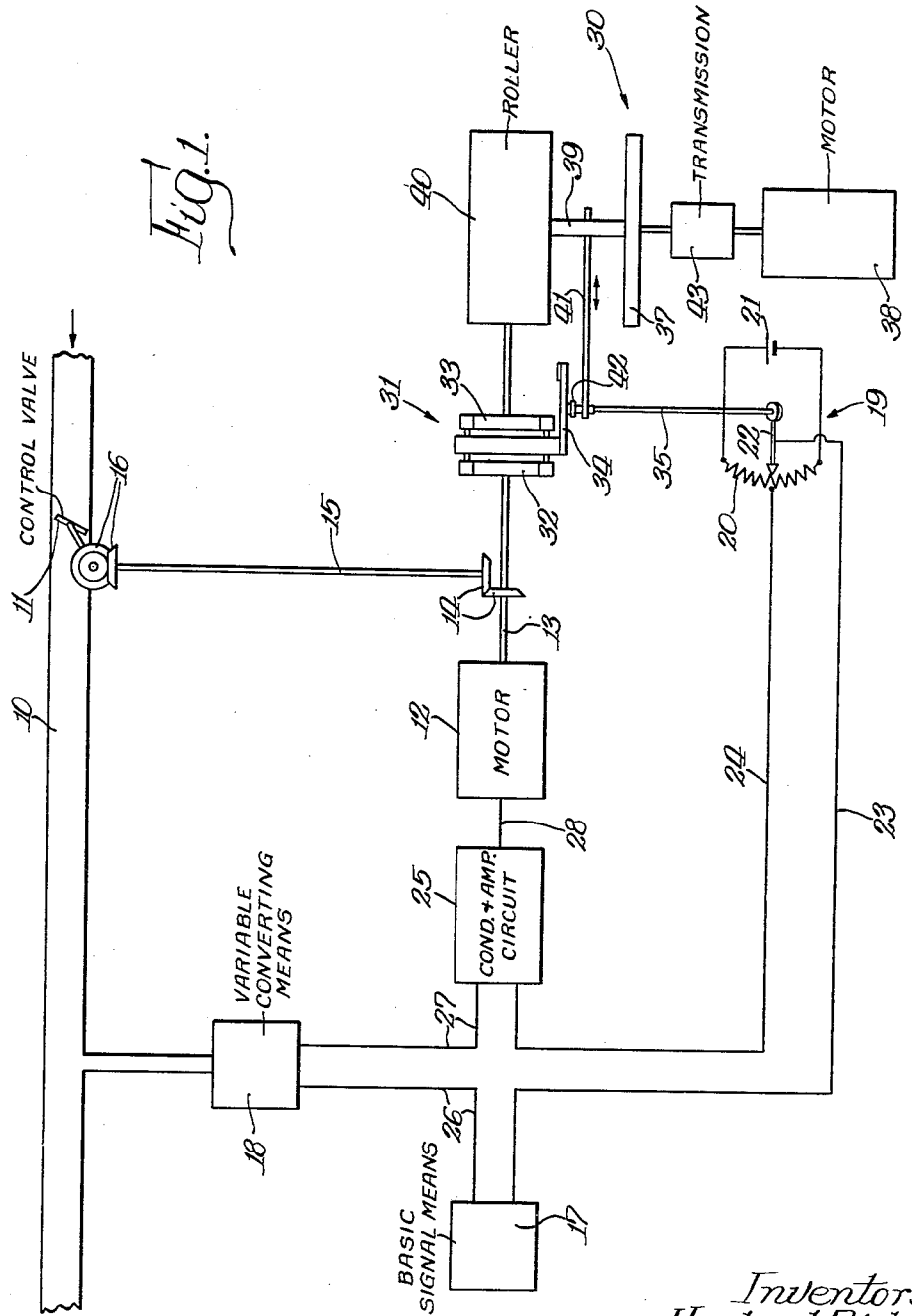

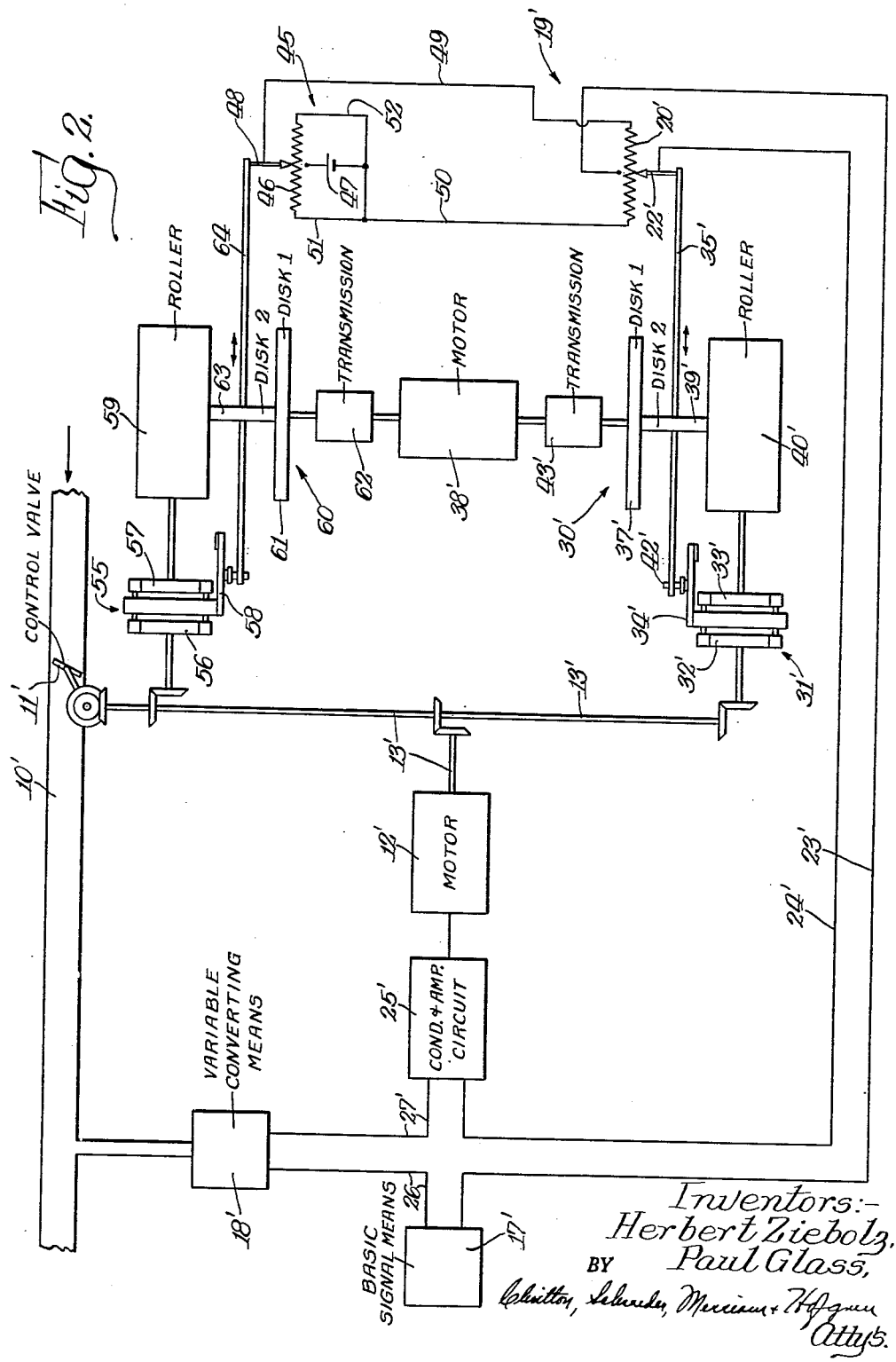

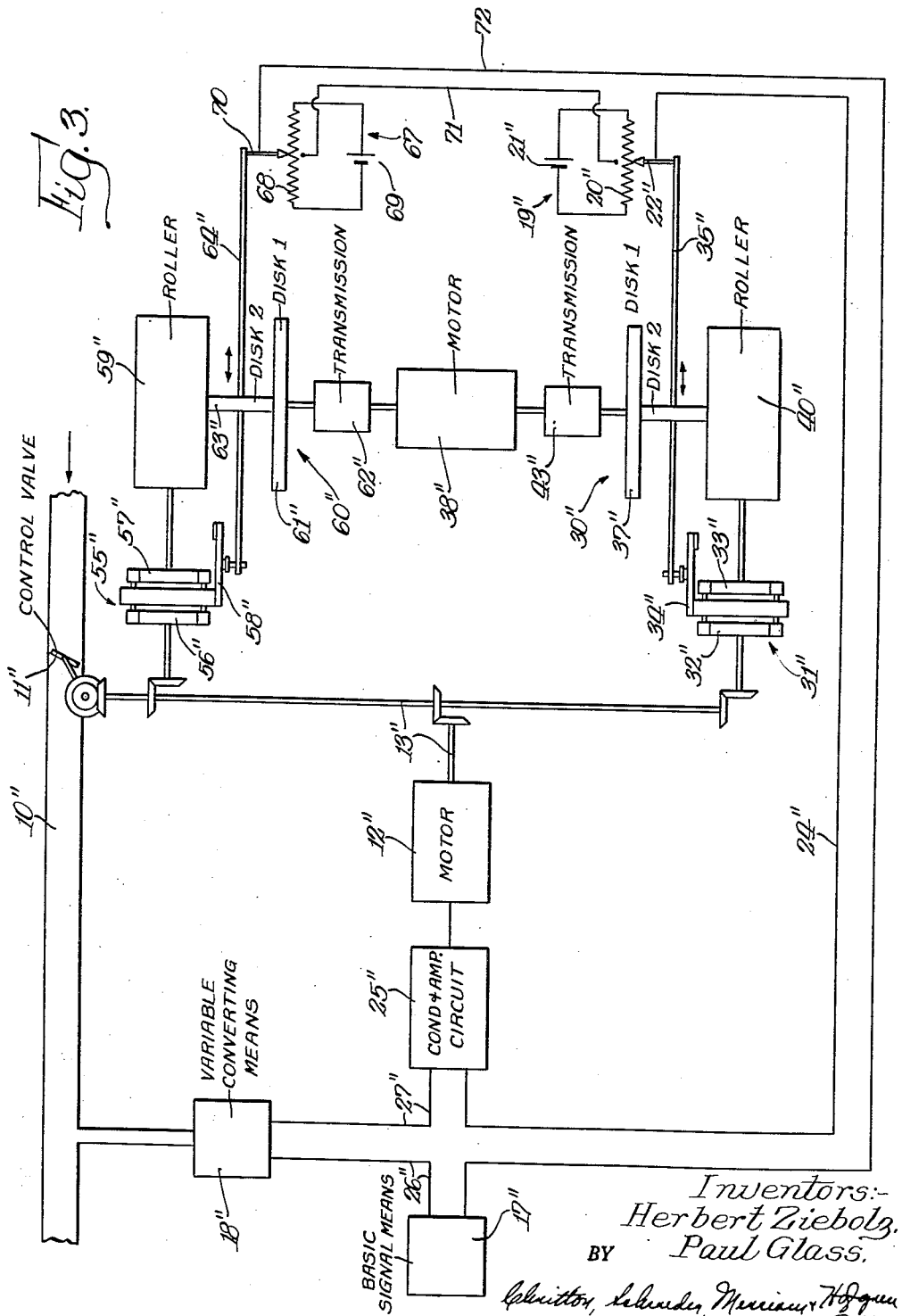

2,594,604

UNITED STATES PATENT OFFICE 2,594,604

STABILIZED CONTROL SYSTEM

Herbert Ziebolz and Paul Glass, Chicago, Ill., assignors to Askania Regulator Company, Chicago, Ill., a corporation of Illinois Application May 18, 1946, Serial No. 670,679

15 Claims. (Cl. 318—28)

The invention relates generally to control systems and more particularly to a system for controlling a variable, such as pressure, temperature, rate of flow or the like.

One object of the invention is to provide a new and improved system for the control of a variable which system is unusually rapid yet very stable in operation.

Another object is to provide a new and improved control system in which the adjustment given a controlling member upon departure of the variable from a predetermined value is approximately proportional to the departure of the variable and is made at a progressively slower rate as the controlling member approaches the end of any particular adjustment.

Still another object is to provide a control system for a variable having proportional control means driven through a planetary gear system from the means controlling the variable, and from means, brought into operation as a result of adjustment of the controlling means, tending to restore the proportional control means at an exponential rate.

Yet another object is to provide a control system of the character immediately above defined in which the means tending to restore the proportional control means at an exponential rate is adjustable to vary its rate of operation.

A further object is to provide a system for controlling a variable having means for controlling the variable, means coming into play as an incident to adjustment of the controlling means and tending to counteract the called-for adjustment of the controlling means, and means also brought into operation as an incident to adjustment of the controlling means functioning to determine the effectiveness of the counteracting means, both of said last named means tending to be restored to a normal position by asymptotic means.

Yet a further object is to provide a control system for controlling a variable having means for controlling the variable, means coming into play as an incident to adjustment of the controlling means tending to counteract the called-for adjustment of the controlling means, and means also coming into play as an incident to adjustment of the controlling means in turn determining the effectiveness of the counteracting means, both of said last mentioned means being influenced at the same rate by adjustment of the controlling means but influenced to return to normal position by means operating on the same rate pattern but possibly at different specific rates.

Still a further object is to provide a system for controlling a variable having means for controlling the variable, means coming into operation as an incident to adjustment of the controlling means to tend to counteract the called-for adjustment of the controlling means, and means also coming into play as an incident to adjustment of the controlling means operable to govern the effectiveness of the counteracting means, the last mentioned means being permissibly adjustable not only to delay or reduce the effect of the counteracting means, but also to aid the called-for adjustment of the controlling means.

Other objects and advantages will become apparent from the following detailed description taken in connection with the accompanying drawings, in which:

Fig. 1 is a diagrammatic illustration of a stabilized control system embodying the features of this invention.

Fig. 2 is a diagrammatic illustration of a slightly modified form of the system disclosed in Fig. 1.

Fig. 3 is a diagrammatic illustration of still another modified form of the system shown in Fig. 1.

While the invention is susceptible of numerous modifications and alternative constructions, it is herein shown and will hereinafter be described in three embodiments. It is not intended, however, that the invention is to be limited thereby to the specific disclosures made. On the contrary, it is intended to cover all modifications and alternative constructions falling within the spirit and scope of the invention as defined in the appended claims.

Generally speaking, the system disclosed herein in the several embodiments is adapted and intended for the control of any variable subject to control such, for example, as pressure, temperature, flow, etc. Usually it is the purpose of a control system to maintain the variable constant at some predetermined value and the invention herein is designed to serve that end though it might be employed to serve other control functions. The system comprises means for controlling the variable, and power means for so regulating the controlling means as to maintain constant the variable being controlled. To that end, the system includes means adjustable to indicate the value at which the variable is to be maintained, means responsive to the variable for indicating the departure of the variable from the predetermined value, and means responsive to the last named plurality of means to cause the power means to adjust the controlling means in various directions and in various positions necessary to restore the variable to the predetermined value. In order that a called-for change in the controlling means may not result in excessive adjustment with resultant hunting, means is provided which is responsive to adjustment of the controlling means and serves temporarily to offset the called-for adjustment of the controlling means, this means being also influenced by an apparatus tending to restore the counteracting means to its normal position at an exponential rate. While all of the embodiments of the invention herein disclosed incorporate such a counteracting means, each embodiment either contains additional structure or has the various means connected in a manner such that the counteracting means is capable of functioning, and usually does function, in a somewhat different manner in each of the embodiments thereby producing results which are different and advantageous.

Referring first to the embodiment disclosed in Fig. 1 of the drawings, the variable to be controlled is, for exemplary purposes, considered to be pressure of some fluid flowing in a conduit 10. The control means for regulating the pressure is here represented as a valve 11, the source of fluid being assumed to be connected to the conduit to the right of the valve 11 and the pressure to be maintained constant in that portion of the conduit to the left of the valve 11. The valve 11 is adapted to be moved to various positions by power means, herein represented generally as a motor 12, acting through a shaft 13, bevel gears 14, a shaft 15 and bevel gears 16. The driving means for the valve 11 must, of course, be capable of actuating the same in either direction and to varying degrees. Though this might be accomplished with a constant speed motor and a variable transmission, it is, for simplicity and efficiency, herein accomplished by having the motor 12 a reversible, variable speed motor.

Herein the motor 12 is under the control of three signal generating means 17, 18 and 19. Of these, the first signal generating means 17 is shown diagrammatically and is of a character capable of producing a signal corresponding to the predetermined value at which the variable is to be maintained. In other words, this first signal generating means 17 generates a basic signal and this means is, moreover, adjustable so as to permit of variation of the predetermined value at which the variable is to be maintained. The second signal generating means 18 is responsive to the variable and functions when the variable is at the value predetermined by adjustment of the first signal generating means 17 to generate a signal which is equal in magnitude but opposite in character to the signal generated by the means 17 in order to counteract and completely offset that signal. As the variable departs in one direction from its predetermined value, specifically, as it rises above the predetermined value, the signal generated by the means 18 will exceed that generated by the means 17, and, conversely, if the variable falls below the predetermined value, the signal generated by the means 18 will be smaller than that generated by the means 17. The resultant signal, therefore, will be of a magnitude corresponding to the degree of departure of the variable from the predetermined value, while the character of the signal will correspond with the direction of departure.

While the signal generating means might generate any one of a variety of signals, they are herein shown as generating electrical signals. The third signal generating means 19, therefore, also is an electrical signal generating means and is shown in greater detail but, nevertheless, by way of example only, as a potentiometer having a winding 20 connected at its ends to any appropriate source 21 of electrical potential. A movable contact 22 of the potentiometer is by a lead 23 represented as electrically connected to the first signal generating means 17, while the midpoint of the winding 20 is by a lead 24 connected to a signal conditioning and amplifying circuit diagrammatically represented at 25. The signal generating means 17 and 18 and the circuit 25 are, of course, properly interconnected electrically, such connection being represented diagrammatically by the leads 26 and 27. The signal conditioning and amplifying circuit 25 may be of any well known construction capable of receiving signals of varying magnitude and opposed character, that is, sign or phase, and of utilizing those signals to cause the motor 12 to rotate in one or the other direction, depending upon the character of the signal, and at different speeds depending upon the magnitude of the signal. The circuit 25 is diagrammatically shown electrically connected to the motor 12 by the lead 28.

As will presently become more apparent, the third signal generating means 19 is connected in a feed-back circuit and in this particular embodiment is an inverse feed-back functioning to add stability to the system while yet permitting rapid adjustment of the controlling means 11 to a new position without hunting. The signal generating means 19 herein functions to bring about an adjustment of the controlling valve 11 which is proportional to the extent of departure of the variable from its predetermined value, rather than an adjustment of the control valve 11, which progresses in the same direction throughout the entire time that the variable is at other than its predetermined value, which type of control must inevitably result in hunting. To effect this adjustment of the valve 11 proportionately to the departure of the variable from its predetermined value, the signal generating means 19 is so arranged as to counteract or offset progressively the signal generated as a result of departure of the variable from its predetermined value as the valve 11 is adjusted. The system is completed by means, generally designated 30, operating to remove the effect of the third signal generating means 19, that is, to restore or reset the means 19 to neutral or normal, so that its signal will not remain and call for adjustment of the valve 11 as the variable returns to its predetermined value and the signals of the means 17 and 18 again balance one another.

In order that the third signal generating means 19 may be actuated first to bring about an adjustment of the valve proportionately to the departure of the variable from its predetermined value by counteracting the signal generated as a result of such departure and may then be restored or reset to neutral or normal position, it is arranged to be actuated by the differential adjustment or actuation of the valve 11 and the resetting means 30. To that end, the signal generating means 19 is driven from a planetary system, generally designated 31, which in turn has elements thereof driven from the valve 11 and the resetting means 30.

Though disclosed somewhat diagrammatically, the planetary gear system 31 includes a first driving gear 32 and a second driving gear 33. The gear 32 is fast on the shaft 13 so as to have a direction and extent of rotation corresponding to the direction and extent of adjustment of the valve 11. The gear 33 is driven from the resetting means 30, as will presently be described in greater particularity. Also included is a third element 34 geared in well known manner to the driving gears 32 and 33 to have a movement representing the differential in the movements of the gears 32 and 33. This third element 34 is through a shaft 35 connected to the movable contact 22 of the signal generating means 19.

The resetting means 30 is of such character that, operating independently, it tends to restore the movable contact 22 of the signal generating means 19 to its normal or neutral position at a rate decreasing exponentially. This is accomplished through the employment of means that may be described as asymptotic or asymptotically operating means. This means comprises a first disk 37 constantly driven from a constant speed motor 38. A second disk 39 is disposed at right angles to the first disk with its periphery in frictional engagement with a face of the first disk and also in frictional engagement with a cylinder 40 fast with the driving gear 33. The disk 39 is mounted for adjustment axially, that is, radially of the disk 37, and it will be appreciated, therefore, that when positioned at the center of the disk 37 it will not transmit any rotation to the cylinder 40 but that, as it is shifted radially outwardly on the disk 37, the rotation transmitted to the roller 40 will increase at an exponential rate. The disk 39 is by a rod 41 and other suitable means, such as a crank 42 if the shaft 35 is rotatable, connected to the shaft 35 so as to partake of the movement given to the shaft by the third element 34 of the planetary gear system 31. More particularly, the disk 39 is so connected to the shaft 35 that it is positioned axially of the disk 37 when the movable contact 22 of the signal generating means is in its neutral or normal position, and is shifted radially outwardly on the disk 37 as the movable contact 22 is moved away from its neutral or normal position. Shift of the disk 39 with departure of the movable contact 22 from neutral is in all cases radially outwardly but is in diametrically opposite directions with departure of the movable contact to the one or the opposite side of neutral. Thus the direction of rotation of the gear 33 is always proper to tend to restore the contact 22 to neutral position. Interposed between the constant speed motor 38 and the disk 37 is a variable transmission 43 whereby the speed of rotation of the disk 37 may be altered, and thereby the exponential curve on which the resetting means 30 operates may be altered.

As an aid to full understanding of the invention, the operation thereof will be briefly described. Let it be assumed, therefore, that the variable is temporarily at the value predetermined by adjustment of the first signal generating means 17. Under this condition, the second signal generating means 18 will be generating a signal which exactly balances or offsets the signal of the means 17. The disk 39 will be exactly axially of the disk 37 and thus not transmitting any rotation to the driving gear 33, and the movable contact 22 of the third signal generating means 19 will be in its neutral or normal position so that the signal means 19 will not be generating any signal. As a consequence, all of the parts of the system save the disk 37, which is constantly rotated, are at rest and in a normal, neutral or balanced state. Assume next that the supply pressure increases or the load decreases so that there is an increase in the pressure of that portion of the conduit 10 to which the signal generating means 18 is responsive. Such departure sets up a signal calling for adjustment of the valve 11 to correct this condition and brings into simultaneous operation various parts of the system. While the various parts or portions of the system, for the most part, operate simultaneously, these operations will, in an attempt to facilitate understanding, be herein described as occurring sequentially.

Under the assumptions made and the liberties taken in the description of the operation, the increase in pressure in the conduit 10 will cause the means 18 to generate a signal which is larger than that generated by the means 17 and thus will cause the motor 12 to adjust the valve 11 toward closed position. The motor will operate at a rate determined by the magnitude of the signal received by the circuit 25. As an incident to adjustment of the valve 11, the driving gear 32 also is rotated proportionately to the extent of adjustment of the valve 11, and the element 34 will, therefore, be actuated to in turn move the contact 22 of the signal generating means 19 away from its neutral position in a direction to cause generation of a signal which is opposed in character to that now being impressed upon the circuit 25. The magnitude of the signal generated by the means 19 increases as the contact 22 is moved away from its neutral position, and thus the signal impressed on the circuit 25 is being reduced progressively as the valve 11 is being adjusted to a new position. Eventually, the signal generated by the means 19 balances the signal impressed on the circuit 25 by the means 17 and 18, and thus brings the motor to rest even though the means 18 may still be calling for further closing of the valve 11 because the variable, herein the pressure in the conduit 10, is still above the predetermined value. It will be appreciated that the signal generated by the means 19 has progressively offset, that is, reduced to zero, the signal difference of the means 17 and 18; and since the speed of operation of the motor 12 is dependent upon the magnitude of the signal impressed on the circuit 25, the rate at which the valve 11 is adjusted is progressively reduced as it approaches the end of the adjusting movement, thereby preventing overrunning as an incident to the inertia of the motor 12.

With the valve 11 now in a new position restricting the conduit 10 to a greater degree, the pressure in the conduit 10 to the left of the valve decreases and with such decrease in pressure the signal generated by the means 18 decreases. It becomes necessary, therefore, to return the movable contact 22 to its neutral position. This is done by the resetting means 30 at first rapidly, and then progressively more slowly. The means 30 was rendered operative by adjustment of the valve 11, for as the shaft 35 was actuated by rotation of the gear 32 the disk 39 was shifted radially of the disk 37 with the result that the disk 37 then became operative to rotate the cylinder 40 and the gear 33 fast therewith. Such rotation of the gear 33, of course, causes movement of the element 34 and with it movement of the shaft 35 and the crank 42. The resetting means 30 is, of course, so assembled that the movement imparted to the shaft 35 is such as will return the movable contact 22 to neutral position. This movement will at first be rapid, for the disk 39 will be engaging the disk 37 out toward the periphery of the disk where the linear speeds are greater. As the shaft 35 is actuated by the resetting means, the disk 39 is shifted back toward the axis of the disk 37 and thus is subjected to constantly decreasing linear speeds, the decrease in speed of the disk 39 being at an exponential rate.

Actually, of course, as already stated, these various operations do not occur in sequence but simultaneously. With the first departure of the variable from the predetermined value, a signal is generated under the control of the means 18 calling for adjustment of the valve 11. As the motor 12 rotates to effect this adjustment, it will simultaneously, through the planetary gear system, tend to rotate the movable contact 22 of the means 19 in a direction causing generation of a signal counter to the signal calling for adjustment of the valve. With the slightest movement of the movable contact 22, however, the disk 39 is shifted and thus the resetting means is rendered operative, acting through the planetary gear system to tend to return the movable contact 22 to its neutral position. The effect of the resetting means 30 with a small shift of the disk 39 away from the axis of the disk 37 is, of course, slight, and thus gives the more effective operation of the motor 12 an opportunity to move the contact 22 and thus permit it to generate a signal halting further adjustment of the valve 11. The precise operation of the system all depends on the relative speeds at which certain changes occur, that is, the speed at which the variable departs from its predetermined value; the speed at which it returns to its predetermined value after adjustment of the valve 11; and the speed at which the adjustment of the valve tends to rotate the movable contact 22 in one direction; and the speed at which the resetting means 30 tends to move that contact in the opposite direction. This latter speed, while still being exponential, may be varied by adjustment of the rate at which the disk 37 rotates.

The ideal operation, of course, would be for the valve 11 to be given a single adjusting movement only, with the variable returned to its predetermined value and with the valve in a position to maintain that predetermined value just as the movable contact 22 is returned to its neutral position. This, however, is a practical impossibility for, of course, to reduce the pressure in the conduit 10, for example, the valve 11 must first be adjusted to permit less than that flow of fluid which would maintain the variable constant under the new conditions. This means, of course, that there must be a succession of adjustments or a continuous adjustment of the valve 11 until the proper conditions are satisfied. In other words, the valve 11 is usually initially slightly over adjusted and then is brought back to proper position as the variable returns to its predetermined value. This initial movement or adjustment of the valve will hereinafter, and particularly in the claims, be referred to as primary movement or adjustment.

Turning now to the form of the invention shown in Fig. 2, it will be seen that the system is basically the same as that disclosed in Fig. 1, with the exception of the precise effect of the proportional control means. The invention is still disclosed as embodying a system for maintaining constant a variable, herein the pressure of the fluid in a conduit 10'. This pressure is varied by controlling means taking the form of a valve 11' driven in opposite directions and at varying speeds from a reversible, variable speed, electric motor 12' through a shaft 13' and necessary gearing or linkage. Governing the electric motor are a first, a second and a third electric signal generating means 17', 18' and 19', respectively. Of these, the first signal generating means 17' generates a basic signal for predetermining the value at which the variable is to be maintained. The means 18' is responsive to the variable and generates a signal which at the predetermined value is equal in magnitude but opposed in character to that generated by the means 17', so as to nullify both signals, and is operable with a rise in the variable to generate a signal larger than that generated by the means 17' and with a fall in the variable to generate a signal smaller than that of the means 17'. The third signal generating means 19' is again in the form of a potentiometer having a winding 20' and a movable contact 22'. The midpoint of the winding 20' is by a lead 23' represented as electrically connected with the means 17', while the movable contact 22' is by a lead 24' represented as electrically connected with a signal conditioning and amplifying circuit diagrammatically represented at 25'. The signal generating means 17' and 18' are, of course, also electrically connected with the circuit 25' and with one another, with these connections here represented by the leads 26' and 27'.

The movable contact 22' of the third signal generating means 19' is still adapted to be actuated by the differential movement of the valve 11' and of a resetting means, generally designated 30'. In order that the movable contact 22' may be influenced by adjustment of both the valve 11' and the resetting means 30', it is operatively coupled to these means through a planetary gear system generally designated 31'. This means comprises a first driving gear 32' and a second driving gear 33'. The gear 32' is driven from the shaft 13' while the gear 33' is driven from the resetting means 30', as will presently be described. A third element 34' of the planetary gear system is geared in well known manner to the driving gears to reflect the differential movements of those gears, and this element is, through suitable means, represented by a shaft 35', connected to the movable contact 22'.

The resetting means 30' comprises a first disk 37' driven from a constant speed motor 38' through a variable transmission 43'. The resetting means 30' is completed by a second disk 39' and a cylinder 40' fast with the driving gear 33'. As pointed out in greater particularity in connection with Fig. 1, the disk 39' is disposed at right angles to the disk 37' and has its periphery in frictional engagement with a face of the disk and with the cylinder 40'. The disk 39' is adapted to be shifted radially of the disk 37' as the movable contact 22' is shifted. Herein the disk 39' is shown as mounted on the shaft 35'.

In place of an electrical source of fixed potential, the means 19' herein has a source of variable potential 45 and, moreover, one which is, like the means 19', itself influenced jointly by the adjustment of the valve 11' and asymptotic means operating at an exponential rate. This source of potential 45 takes the form of a potentiometer having a winding 46, with a midpoint connected to a source of constant potential 47, and a movable contact 48. The contact 48 is by a lead 49 connected to one end of the winding 20', while the other end of this winding is by a lead 50 connected through branch leads 51 and 52 to the opposite ends of the winding 46. The branch lead 52 is also connected to the remaining terminal of the voltage source 47. It will be seen from the foregoing that, whereas the signal generated by the means 19' is zero, when the contact 22' is in the neutral position shown, and increases in magnitude as the contact moves in either direction from its neutral position (assuming a constant voltage impressed on the winding 20'), the potentiometer 45, however, impresses a maximum voltage on the winding 20' when the movable contact 48 is in the neutral position shown, and impresses a progressively decreasing voltage as the contact 48 moves in either direction away from its neutral position. The signal generated by the means 19', therefore, will be dependent not merely upon the position of its movable contact 22' but also upon the position of the contact 48 of the potentiometer 45.

The contact 48 of the potentiometer 45 is moved by means identical with those moving the contact 22'. Suffice it to say, therefore, that there is provided in this form of the invention a second planetary gear system, generally designated 55, comprising a first driving gear 56, a second driving gear 57, and an element 58 having a movement indicating the differential of the movements of the driving gears 56 and 57. The gear 56 is driven from the shaft 13', while the gear 57 is driven by a cylinder 59 forming part of asymptotic means, generally designated 60. This means includes a first disk 61 driven at a constant rate by the motor 38' through a variable transmission 62. Completing the asymptotic means 60 is a disk 63 interposed between the disk 61 and the cylinder 59 and adapted to be shifted radially of the disk 61 with movement of the element 58. Herein the disk 63 is shown rotatable on but held against axial shifting along a shaft 64 which extends from the element 58 to the movable contact 48.

In this form of the invention, greatly enhanced flexibility of control is obtained. Depending upon the magnitude of the voltage impressed on the winding 20' of the third signal generating means 19', and further depending upon the time when such voltage is impressed, the signal generated by the means 19' may take on a substantially different character. For example, by proper adjustment of the devices a mode of operation can be obtained which is very desirable and, moreover, is one that is commonly sought. More particularly, this mode of operation is one in which the proportional control means, that is, the signal generating means 19', is temporarily either delayed in the generation of a signal, or the application or effect of the signal is delayed so as to permit the signal calling for adjustment of the valve means 11' to have full sway for an initial period of time. With the signal generated by the proportional control means thus temporarily withheld, the valve means 11' is more rapidly adjusted with the entire system thus rendered more quickly responsive. This mode of operation could be obtained by having the asymptotic means 60 driven at a slow rate and the asymptotic means 30' driven at a high rate. On the other hand, the various devices might be adjusted to have the asymptotic means 60 driven at a high rate by the motor 38' and the asymptotic means 30' driven at a very slow rate. Under these conditions, the signal generated by the means 19' would remain at a higher magnitude for a longer period of time for the movable contact 48 would be quickly returned to its neutral position to impress the maximum voltage upon the winding 20'. It will be appreciated that in between these two extremes the speeds at which the means 30' and 60 are operated could be varied, with each variation producing a slightly different signal produced by the means 19'.

Turning now to the form of the invention shown in Fig. 3, it will be seen that the system is basically the same as that disclosed in Fig. 1 with the exception of the precise effect of the proportional control means. The invention is still disclosed as embodied in a system for maintaining constant a variable, herein the pressure of the fluid in a conduit 10''. This pressure is varied by controlling means taking the form of a valve 11'' driven in opposite directions and at varying speeds form a reversible, variable speed, electric motor 12'' through a shaft 13'' and necessary gearing or linkage. Governing the electric motor are a first, a second, and a third electric signal generating means 17'', 18'' and 19'', respectively. Of these, the first signal generating means 17'' generates a basic signal for predetermining the value at which the variable is to be maintained. The means 18'' is responsive to the variable and generates a signal which at the predetermined value is equal in magnitude but opposed in character to that generated by the means 17'', so as to nullify both signals, and is operable with a rise in the variable to generate a signal larger than that generated by the means 17'' and with a fall in the variable to generate a signal smaller than that of the means 17''. The third signal generating means 19'' is again in the form of a potentiometer having a winding 20'', a source of potential 21'', and a movable contact 22''. The movable contact 22'' is by a lead 24'' represented as electrically connected with a signal conditioning and amplifying circuit diagrammatically reresented at 25'', and the signal generating means 17'' and 18'' are, of course, also electrically connected with the circuit 25'' and with one another, with these connections here represented by the leads 26'' and 27''.

The movable contact 22'' of the third signal generating means 19'' is still adapted to be actuated by the differential movement of the valve 11'' and of a resetting means, generally designated 30''. In order that the movable contact 22'' may be influenced by adjustment of both the valve 11'' and the resetting means 30'', it is operatively coupled to these means through a planetary gear system, generally designated 31''. This means comprises a first driving gear 32'' and a second driving gear 33''. The gear 32'' is driven from the shaft 13'', while the gear 33'' is driven from the resetting means 30'', as will presently be described. A third element 34'' of the planetary gear system is geared in well known manner to the driving gears to reflect the differential movements of those gears, and this element is, through suitable means represented by a shaft 35'', connected to the movable contact 22''.

The resetting means 30'' comprises a first disk 37'' driven from a constant speed motor 38'' through a variable transmission 43″. The resetting means 30″ is completed by a second disk 39″ and a cylinder 40″ fast with the driving gear 33″. As pointed out in greater particularity in connection with Fig. 1, the disk 39″ is disposed at right angles to the disk 37″ and has its periphery in frictional engagement with a face of the disk and with the cylinder 40″. The disk 39″ is adapted to be shifted radially of the disk 37″ as the movable contact 22″ is shifted. Herein the disk 39″ is shown as mounted on the shaft 35″.

In this form of the invention, the feed-back signal is not derived entirely from the signal generating means 19″ but is derived jointly from the means 19″ and a fourth signal generating means 67. This latter means is also a potentiometer and comprises a winding 68, a source of potential 69 and a movable contact 70. A lead 71 connects the mid-points of the two windings 20″ and 68 while a lead 72 connects the movable contact 70 with the first signal generating means 17″. Thus the feed-back signal may vary greatly depending upon the relative magnitude and character of the signals generated by the means 19″ and 67. This latter, of course, depends upon the relative position of the movable contacts 22″ and 70 and the magnitude of the potential sources 21″ and 69.

The contact 70 of the potentiometer 67 is moved by means identical with those moving the contact 22″. Suffice it to say, therefore, that there is provided in this form of the invention a second planetary gear system, generally designated 55″, comprising a first driving gear 56″, a second driving gear 57″ and an element 58″ having a movement indicating the differential of the movements of the driving gears 56″ and 57″. The gear 56″ is driven from the shaft 13″ while the gear 57″ is driven by a cylinder 59″ forming part of asymptotic means, generally designated 60″. This means includes a first disk 61″ driven at a constant rate by the motor 38″ through a variable transmission 62″. Completing the asymptotic means 60″ is a disk 63″ interposed between the disk 61″ and the cylinder 59″ and adapted to be shifted radially of the disk 61″ with movement of the element 58″. Herein the disk 63″ is shown rotatable on but held against axial shifting along a shaft 64″ which extends from the element 58″ to the movable contact 70.

In this form of the invention, still greater flexibility of control is obtained. Not only may the rates of operation of the asymptotic means 30″ and 60″ be varied with the resultant variations in an inverse feed-back signal obtained in the other forms, but the potentiometers 19″ and 67 may be so connected that with proper adjustment of the asymptotic means an aiding rather than an inverse feed-back signal may be obtained. For example, if voltage source 69 be made larger than 21″ and asymptotic means 60″ be made to have a higher rate of operation than means 30″, the means 67 could temporarily become dominant thereby adding to the called-for change in the valve 11″. Due to the higher rate of return of the contact 70 to neutral position, the means 67 would, after a brief interval, lose its dominant position to means 19″ with its inverse feed-back signal. Here again, therefore, a mode of operation could be obtained in which the application or effect of the signal generated by the proportional control means and normally tending to offset the signal generated by the means responsive to the condition is temporarily delayed so as to permit the system to operate for a limited period of time at the rate resulting from the application of the full main signal to the motor 12″. In fact, it is even possible in this form of the invention to bring about even more rapid adjustment of the valve 11″ by so adjusting the speed of operation of the asymptotic means that an aiding signal is initially added to the signal generated by the means 18″. The above is, of course, but one of the advantages of the enhanced flexibility of control and others will readily occur to those skilled in the art.

We claim as our invention:

1. In a stabilized control system, means for controlling a variable, means including a device responsive to departure of the variable from a predetermined value generating an electrical signal proportional to the degree of departure and of a character indicating the direction of departure calling for adjustment of said controlling means, and a second signal generating means responsive to adjustment of said controlling means operable as an incident to the primary adjusting movement of said controlling means in adjustment from an old to a new position and independently of said first mentioned signal generating means to generate an electrical signal increasing in magnitude and opposed in character to the signal generated by said first mentioned signal generating means and combined therewith progressively to reduce the rate of adjustment of said controlling means as said controlling means approaches the end of the primary movement, and means operating in response to adjustment of said controlling means for reducing the signal generated by said second signal generating means at an exponential rate.

2. A system for controlling a variable comprising means for controlling the variable including means responsive to an electrical signal for adjusting said controlling means in opposite directions and at variable rates depending upon the character and magnitude of the electrical signal, a first signal generating means adjustable to generate a signal predetermining the value at which the variable is to be maintained, a second signal generating means responsive to departure of the variable from the predetermined value operable to generate a signal calling for adjustment of said controlling means to restore the variable to its predetermined value, a third signal generating means normally in a neutral position in which it generates a signal of zero magnitude and operable to generate a signal of increasing magnitude as it is moved in either direction from its neutral position, all of said signal generating means being connected to the signal responsive means to operate the controlling means, said third signal generating means being moved from neutral position by adjustment of said controlling means to generate a signal of a character opposed to that generated by said second signal generating means, and means brought into operation as an incident to adjustment of said controlling means and influencing said third signal generating means, to restore the second signal generating means to neutral position at an exponential rate.

3. A system for controlling a variable comprising means for controlling the variable including means responsive to an electrical signal for adjusting said controlling means in opposite directions and at variable rates depending upon the character and magnitude of the electrical signal, a first signal generating means adjustable to generate a signal predetermining the value at which the variable is to be maintained, a second signal generating means responsive to departure of the variable from the predetermined value operable to generate a signal calling for adjustment of said controlling means to restore the variable to its predetermined value, a third signal generating means normally in a neutral position in which it generates a signal of zero magnitude and operable to generate a signal of increasing magnitude as it is moved in either direction from its neutral position, all of said signal generating means being connected to said signal responsive means to operate the controlling means, asymptotically operating means, and means for actuating said third signal generating means driven jointly from said controlling means and said asymptotic means, initial movement of said controlling means acting to move said third signal generating means away from neutral in a direction to generate a signal opposing that generated by said second signal generating means and said asymptotic means being placed in operation as an incident to adjustment of said controlling means and operating to restore said third signal generating means to neutral.

4. A system for controlling a variable comprising means for controlling the variable including means responsive to an electrical signal for adjusting said controlling means in opposite directions and at variable rates depending upon the character and magnitude of the electrical signal, a first signal generating means adjustable to generate a signal predetermining the value at which the variable is to be maintained, a second signal generating means responsive to departure of the variable from the predetermined value operable to generate a signal calling for adjustment of said controlling means to restore the variable to its predetermined value, a third signal generating means normally in a neutral position in which it generates a signal of zero magnitude and operable to generate a signal of increasing magnitude as it is moved in either direction from its neutral position, all of said signal generating means being connected to said signal responsive means to operate the controlling means, asymptotically operating means, said asymptotic means being adjustable to operate on different exponential curves, and means for actuating said third signal generating means driven jointly from said controlling means and said asymptotic means, initial movement of said controlling means acting to move said third signal generating means away from neutral in a direction to generate a signal opposing that generated by said second signal generating means and said asymptotic means being placed in operation as an incident to adjustment of said controlling means and operating to restore said third signal generating means to neutral.

5. A system for controlling a variable comprising means for controlling the variable including means responsive to an electrical signal for adjusting said controlling means in opposite directions and at variable rates depending upon the character and magnitude of the electrical signal, a first signal generating means adjustable to generate a signal predetermining the value at which the variable is to be maintained, a second signal generating means responsive to departure of the variable from the predetermined value operable to generate a signal calling for adjustment of said controlling means to restore the variable to its predetermined value, a third signal generating means normally in a neutral position in which it generates a signal of zero magnitude and operable to generate a signal of increasing magnitude as it is moved in either direction from its neutral position, all of said signal generating means being connected to said signal responsive means to operate the controlling means, asymptotically operating means, and planetary gear means for actuating said third signal generating means driven jointly from said controlling means and said asymptotic means, initial adjustment of said controlling means tending to move said third signal generating means from neutral position in a direction causing generation of a signal opposing that generated by said second signal generating means and rendering said asymptotic means operative, said asymptotic means tending to restore said third signal generating means to neutral position.

6. In a stabilized control system, means for controlling a variable, means responsive to departure of the variable from a predetermined value to generate a signal calling for adjustment of said controlling means, power means controlled by the signal for adjusting said controlling means, feed-back signal generating means placed into operation as an incident to adjustment of said controlling means, asymptotic means for controlling said feed-back signal means jointly with said controlling means, and means exercising additional control over said feed-back means including a second means placed in operation as an incident to adjustment of said controlling means and functioning at an exponentially decreasing rate.

7. A system for controlling a variable comprising means for controlling the variable including means responsive to an electrical signal for adjusting said controlling means in opposite directions and at variable rates depending upon the character and magnitude of the electrical signal, a first signal generating means adjustable to generate a signal predetermining the value at which the variable is to be maintained, a second signal generating means responsive to departure of the variable from the predetermined value operable to generate a signal calling for adjustment of said controlling means to restore the variable to its predetermined value, a third signal generating means normally in a neutral position in which it generates a signal of zero magnitude and operable to generate a signal of increasing magnitude as it is moved in either direction from its neutral position, a first asymptotically operating means, differential means for moving said third signal generating means jointly actuated by said controlling means and said asymptotic means to cause said third signal generating means to generate a signal opposing that generated by the second signal generating means, and means providing the potential for said third signal generating means including a second asymptotically operating means and differential means jointly actuated by said second asymptotic means and said controlling means governing said potential providing means.

8. A system for controlling a variable comprising means for controlling the variable including means responsive to an electrical signal for adjusting said controlling means in opposite directions and at variable rates depending upon the character and magnitude of the electrical signal, a first signal generating means adjustable to generate a signal predetermining the value at which the variable is to be maintained, a second signal generating means responsive to departure of the variable from the predetermined value operable to generate a signal calling for adjustment of said controlling means to restore the variable to its predetermined value, a first potentiometer forming a third signal generating means and connected in feed-back relation with said first and second signal generating means, a second potentiometer constituting the voltage source of said first potentiometer, a differential means for adjusting each of said potentiometers actuated from said controlling means, and an asymptotically operating means also driving each differential means, the voltages of said potentiometers for like adjustments varying in opposite directions.

9. A system for controlling a variable comprising means for controlling the variable including means responsive to an electrical signal for adjusting said controlling means in opposite directions and at variable rates depending upon the character and magnitude of the electrical signal, a first signal generating means adjustable to generate a signal predetermining the value at which the variable is to be maintained, a second signal generating means responsive to departure of the variable from the predetermined value operable to generate a signal calling for adjustment of said controlling means to restore the variable to its predetermined value, a first potentiometer forming a third signal generating means connected in feed-back relation with said first and second signal generating means and including a movable contact and operable with a fixed potential source to generate a signal of increasing magnitude as the contact is moved in either direction from a neutral position, a second potentiometer constituting the voltage source of said first potentiometer and including a movable contact, said second potentiometer operating upon movement of its movable contact in either direction away from a neutral position to decrease the voltage applied to said first potentiometer, a differential means for adjusting each of said movable contacts actuated from said controlling means, and an asymptotically operating means also driving each differential means, said asymptotically operating means being rendered operative as an incident to movement of the associated movable contact away from neutral position and tending to actuate said differential means to restore the movable contact to neutral position.

10. A system for controlling a variable comprising means for controlling the variable including means responsive to an electrical signal for adjusting said controlling means in opposite directions and at variable rates depending upon the character and magnitude of the electrical signal, a first signal generating means adjustable to generate a signal predetermining the value at which the variable is to be maintained, a second signal generating means responsive to departure of the variable from the predetermined value operable to generate a signal calling for adjustment of said controlling means to restore the variable to its predetermined value, a first potentiometer forming a third signal generating means connected in feed-back relation with said first and second signal generating means and including a movable contact and operable with a fixed potential source to generate a signal of increasing magnitude as the contact is moved in either direction from a neutral position, a second potentiometer constituting the voltage source of said first potentiometer and including a movable contact, said second potentiometer operating upon movement of its movable contact in either direction away from a neutral position to decrease the voltage applied to said first potentiometer, a pair of planetary gear systems each having a first and a second driving gear and a third element driven from the differential movements of said driving gears, one of said driving gears of each planetary gear system being driven from said controlling means, an asymptotically operating means associated with each planetary gear system including a constantly rotating disk and means for transmitting rotation of the disk to the other of said driving gears including a second disk disposed at right angles to the first mentioned disk and having frictional engagement with a surface of said first mentioned disk, and means operatively connecting the third element of each planetary gear system with the second disk of the associated asymptotically operating means and with the movable contact of one of said potentiometers in such manner that the second disk receives no rotation from the first mentioned disk when the movable contact is in neutral position.

11. In a stabilized control system, means for controlling a variable, means responsive to departure of the variable from a predetermined value to generate a signal calling for adjustment of said controlling means, means responsive to the signal for adjusting said controlling means, and means responsive to adjustment of said controlling means operable to generate a feed-back signal, and a second means responsive to adjustment of said controlling means and including a potentiometer controlling the feed-back signal generating means to generate a signal which initially aids and subsequently counteracts the signal calling for adjustment of said controlling means.

12. In a stabilized control system, means for controlling a variable, means responsive to departure of the variable from a predetermined value to generate a signal calling for adjustment of said controlling means, means responsive to the signal adjusting said controlling means, means responsive to adjustment of said controlling means operable to generate a feed-back signal, said last mentioned means comprising a pair of signal generating devices connected to have the signal of the one modified by the signal of the other, and drive means for each signal generating device rendered operative as an incident to adjustment of said last named signal generating means from a neutral position and functioning to tend to return said last named signal generating means to neutral position, said drive means being adjustable to operate at various rates.

13. In a stabilized control system, means for controlling a variable, means responsive to departure of the variable from a predetermined value to generate a signal calling for adjustment of said controlling means, means responsive to the signal adjusting said controlling means, means for generating a feed-back signal including a pair of signal generating devices connected together so that the signal of the one modifies the signal of the other, each of said devices having a neutral position in which no signal is generated, and means for adjusting each of said signal generating devices comprising a planetary gear system and asymptotically operating means, the planetary gear system being driven by said controlling means and said asymptotically operating means and having an element actuated by the differential drive imparted to the planetary gear system operatively associated with the signal generating device and an element of said asymptotically operating means whereby adjustment of said controlling means tends to move the signal generating means away from neutral position and tends to render operative said asymptotically operating means while said asymptotically operating means tends to restore the signal generating means to neutral position.

14. In a stabilized control system, means for controlling a variable, a first signal generating means operable to generate a signal indicating the value at which the variable is to be maintained, a second electrical signal generating means responsive to departure of the variable from the predetermined value operable to generate a signal calling for adjustment of said controlling means, means responsive to the resultant signal for adjusting said controlling means and said feed-back signal generating means comprising a third and a fourth signal generating means connected in series and having a normal adjustment in which no signal is generated, and means for each said third and fourth signal generating means for effecting adjustment thereof comprising a planetary gear system having one driving gear driven as an incident to adjustment of said controlling means and a second driving gear and asymptotically operating means driving said second driving gear, and an element actuated by the differential movements of said driving gears operatively associated with one of said third or fourth signal generating means and with an element of said asymptotically operating means, said controlling means tending to adjust the signal generating means associated therewith away from neutral position and said asymptotically operaing means tending to restore the associated signal generating means to neutral position.

15. In a stabilized control system, a first signal generating means responsive to departure of a variable from a predetermined value to generate a signal indicative of the direction of departure and proportional to the extent of departure, mechanism for controlling the variable, a second signal generating means connected to have its signal combined with that of said first signal generating means, means responsive to the combined signal governing said mechanism for controlling the variable, differential means having a first driving element connected to be driven in a straight line relationship to said mechanism for controlling the variable, and a differentially operated element, said second signal generating means being connected to said differentially operated element to be influenced by adjustment of said mechanism for controlling the variable and operable in the absence of other influences to generate a signal opposed in character to that generated by said first signal generating means and increasing as said mechanism for controlling the variable is initially adjusted from an old to a new position, and means connected to a second driving element of said differential means also influencing said second signal generating means to restore the same to normal position, said last named means coming into operation as an incident to any adjustment of said mechanism for controlling the variable and operating at an exponential rate.

HERBERT ZIEBOLZ.
PAUL GLASS.

REFERENCES CITED

The following references are of record in the file of this patent:

UNITED STATES PATENTS

| Number | Name | Date |
| --- | --- | --- |
| 2,278,396 | Saur | Mar. 31, 1942 |
| 2,335,163 | Smith | Nov. 23, 1943 |
| 2,367,746 | Williams | Jan. 23, 1945 |
| 2,376,513 | Shaffer | May 22, 1945 |
| 2,405,774 | Blakeslee | Aug. 13, 1946 |

FOREIGN PATENTS

| Number | Country | Date |
| --- | --- | --- |
| 350,995 | Great Britain | June 11, 1931 |